A. ARFVIDSON.
COOKING UTENSILS.

No. 180,308. Patented July 25, 1876.

Witnesses
Saml. J. Van Stavoren
Jos. R. Connolly

Inventor
Amedei Arfvidson
Connolly Bros., Attorneys

UNITED STATES PATENT OFFICE.

AMEDEI ARFVIDSON, OF PHILADELPHIA, PENNSYLVANIA.

IMPROVEMENT IN COOKING UTENSILS.

Specification forming part of Letters Patent No. 180,308, dated July 25, 1876; application filed June 10, 1876.

*To all whom it may concern:*

Be it known that I, AMEDEI ARFVIDSON, of Philadelphia, in the county of Philadelphia and State of Pennsylvania, have invented certain new and useful Improvements in Cooking Utensil; and I do hereby declare the following to be a full, clear, and exact description of the invention, such as will enable others skilled in the art to which it pertains to make and use it, reference being had to the accompanying drawings, which form part of this specification, in which—

Figure 1:
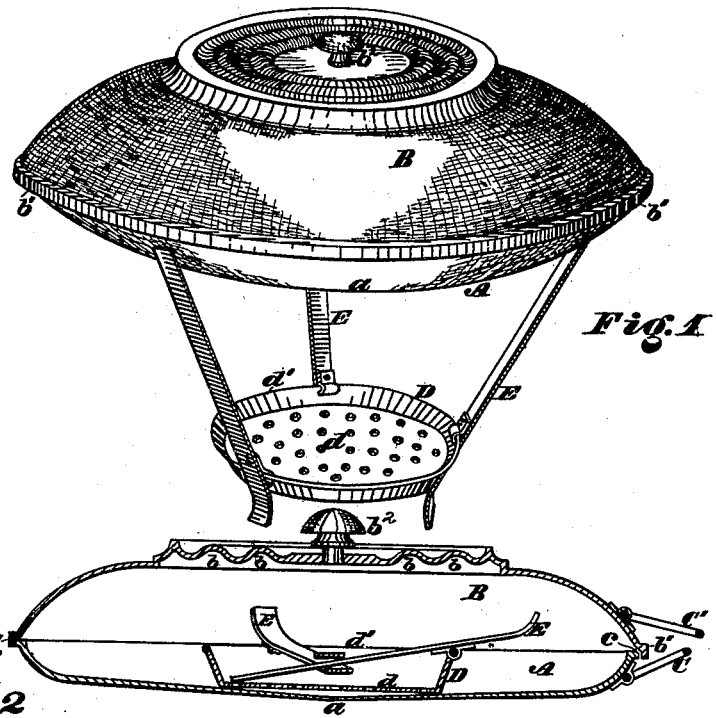
Figure 2:
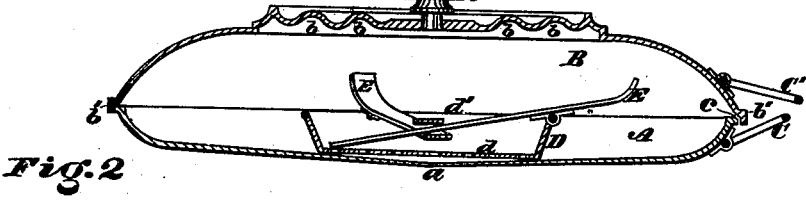
Figure 3:
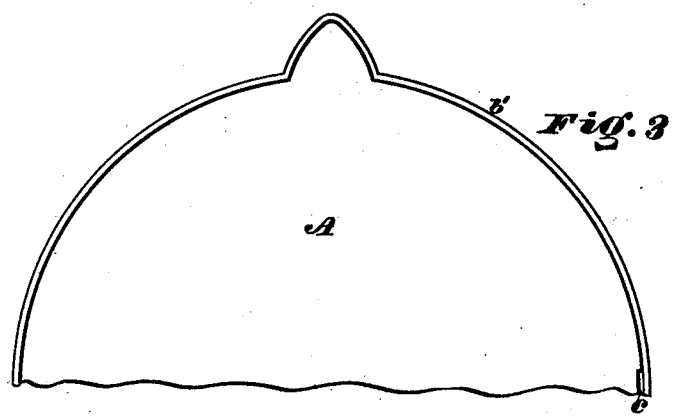

Figure 1 is a perspective of my invention; Fig. 2, a transverse vertical section of the dish, with the fire-pot and hinged legs placed therein. Fig. 3 is a plan of the dish inverted.

The object of my invention is to provide a portable utensil, in which a beefsteak may be fried, an egg boiled, an omelette prepared, or other dish requiring only a short time for its cooking may be "done," ready for eating, by the simple application of the heat arising from a small quantity of paper burned beneath the vessel.

My invention consists of a vessel composed of two concave or saucer-shaped dishes, which are formed of stamped sheet-iron or other metal, being a good conductor of heat, arranged so that their edges will meet, forming a shallow and nearly air-tight chamber, within which the article to be cooked is placed. To quicken the passage of heat to the interior of the chamber, the under dish is so formed that it is thinner about the middle or center than at the border; and the upper dish or cover is provided with concave or convex circles for the purpose of increasing its radiating-surface within the chamber. Both the body or lower section of the dish and the cover or upper section are provided with rings, by which they may be locked and lifted together. The cover should have a button of wood or other material being a non-conductor of heat, by means of which it may be lifted without injury to the hand of the cook; and the body may, if desired, have a handle and spout like any ordinary frying-pan, a cover for the spout being attached to the upper section of the dish, and arranged so as to close hermetically. Beneath the dish is placed a small metallic pan with perforated bottom, supported upon three hinged flaring legs, said legs also affording support to the dish when in use.

When it is desired to use the utensil the legs of said pan are elevated, and the body of the dish made to rest upon or between their upper extremities. When the utensil is not in use the legs are folded in upon the pan, which is then stowed away inside the dish.

Referring to the accompanying drawing, A designates the body of the vessel, consisting of a concave or saucer-shaped dish, the metal of which it is composed being thinnest about the middle or center $a$. B represents a somewhat similarly-shaped section, the metal of which, however, is of an even thickness throughout, and is formed or provided with ridges and grooves, as shown at $b$, for the purpose of increasing its radiating-surface. This section B, which forms the cover of the vessel, is provided with a flange, $b^1$, which fits down around the edge of the body A, serving to hold the two sections firmly together, and is furnished, also, with a wooden or non-conducting button, $b^2$, by means of which said cover may be lifted from the body A, when necessary, without burning the cook's hand. C C' represent rings attached, respectively, to the sections A B, said rings being of unequal diameters, so as that they will interlock, and thus serve to hold said sections together. D represents a shallow pan, formed of a single piece of stamped sheet metal, having a perforated bottom, $d$, and wire edge $d'$. Upon said wire edge are pivoted legs E E E, which flare, as shown, supporting the dish in which the articles are cooked between or upon their upward extremities.

The method of operation is as follows: Place the article to be cooked in the dish A, put on the cover B, and interlock the rings C C'. Set the dish upon the elevated legs E E, and burn a small quantity of paper or other light inflammable material in the pan D. Water will boil and beefsteak be fried in this way in two minutes; eggs in a minute and a half.

The vessel is provided with a small opening, for the exit of vapor, formed by cutting away a portion of either section A or B.

What I claim as my invention is—

1. A cooking utensil formed of two concave or saucer-shaped dishes, held together by their edges, and forming a shallow and nearly air-tight vessel, substantially as shown and described.

2. The body A of a cooking utensil, having its middle or center of thinner metal than its border, to permit the speedy transmission of heat to the interior of the vessel, in combination with the heater or pan D, substantially as set forth.

3. The pan D, having perforated bottom $d$, and hinged flaring legs E, substantially as illustrated, for the purpose mentioned.

4. The combination of the vessel composed of the dish-sections A B, with the pan D, having flaring hinged legs, said legs sustaining the vessel when in use, and being adapted to be folded and placed therein, substantially as shown and described.

In testimony that I claim the foregoing I have hereunto set my hand this 3d day of June, 1876.

AMEDEI ARFVIDSON.

Witnesses:
SAML. J. VAN STAVOREN,
CHAS. F. VAN HORN.